Patented Aug. 1, 1939

2,167,807

UNITED STATES PATENT OFFICE 2,167,807

HALOGENATED AMINES AND A PROCESS OF MAKING THEM

Leon Lilienfeld, Vienna, Austria; Paul Abel, Vienna, Austria (Germany), or in the case of his inability to act Emerich Hunna, Vienna, Austria (Germany), executors, and Antonette Lilienfeld, Vienna, Austria (Germany), sole heir of Leon Lilienfeld, deceased No Drawing. Application October 3, 1933, Serial No. 692,037. In Great Britain July 4, 1931

10 Claims. (Cl. 260—585)

In my U. S. application Ser. No. 618,800 filed June 22, 1932, and of which the present is in part a continuation (and in application Ser. No. 134,426 filed April 1, 1937, as a continuation-in-part for 618,800), I have described the manufacture of organic compounds containing nitrogen, wherein ammonia (which may be in the form of an aqueous solution), is caused to react at a temperature below 100° C. with an unsubstituted dihalogenhydrin.

The present invention is an improvement in or a modification of that described in the said specification.

Acording to the present invention the reaction between an unsubstituted dichloro- or dibromohydrin and ammonia is conducted in presence of water as the solvent or diluent and the temperature is allowed to rise above 100° C. during the reaction; a product containing halogen and having good properties is obtained.

For example the process may be conducted in the following manner:

1000 parts of an aqueous ammonia solution of 23 per cent. strength are added to 1000 parts of α-dichlorohydrin contained in a pressure vessel, whereupon the mixture is shaken, without extraneous supply of heat. The reaction being exothermic, the temperature rises within a short time to 60 to 70° C. and may reach, after 1 to 2 hours, 110 to 120° C. After a short time, the violent reaction calms down and the reaction mass is allowed to cool spontaneously. After about 50 minutes reckoned from the time at which the temperature rose to 120° C. the temperature of the reaction mixture may fall to 74 to 80° C. and thereafter it is allowed to cool to room temperature, by standing several hours (e. g., over night). Artificial cooling can be applied if desired, but is unnecessary. The reaction mass is a clear, yellow fluid. During the cooling, crystals of NH$_4$Cl separate and settle upon the bottom of the vessel. The mother liquid is freed from the crystals by filtration and is evaporated at 30 to 40° C. at an absolute pressure of 18 mm. The very viscous residue interposed with crystals, is dried in vacuo at 30 to 40° C. until free from water. The doughy residue is kneaded with repeatedly renewed portions of alcohol until a small portion of the alcohol leaves no residue on evaporation.

The alcoholic solutions are united, filtered until clear and freed from alcohol under reduced pressure at 30 to 40° C.

The dry residue left by evaporating the alcohol from the alcoholic solution, is a very viscous honey like mass. This product is soluble in water, alcohol and pyridine, but insoluble or only scarcely soluble in ether, acetone and carbon tetrachloride.

The alcohol-insoluble residue of the kneading operation is dried under reduced pressure at 20 to 30° C. until constant weight. After drying it is a tough light yellowish mass which contains a considerable amount of ammonium chloride. This product is soluble in water, but insoluble in alcohol, ether, acetone, benzene, carbon tetrachloride and pyridine.

The reaction products can be purified by the action thereon of differential solvents. Several purification methods are described in detail in the parent application, which it does not appear necessary to quote here.

The process can also be conducted by dissolving the dichlorohydrin in water and introducing the ammonia into the aqueous dichlorohydrin solution in the form of dry gaseous ammonia. The ratio of ammonia to dichlorohydrin may be the same as in the above example, namely, about 1.7 mols of NH$_3$ per mol of dichlorohydrin but the invention is not restricted to this specific ratio.

In the foregoing example, instead of α-dichlorohydrin, β-dichlorohydrin may be used.

Where desired or expedient, instead of dichlorohydrin, the molecularly equivalent quantity of dibromohydrin may be used.

As in the aforesaid specification, instead of the halogen derivative used in the example, equimolecular proportions of other unsubstituted dichlorohydrines or dibromohydrins of such polyhydric alcohols may be used, for example, as erythrite dichlorohydrin (CH$_2$Cl.CH(OH).CH(OH).CH$_2$Cl), or mannite dichlorohydrin (C$_6$H$_8$Cl$_2$(OH)$_4$).

The organic reaction products are characterized by containing aliphatic compounds having at least one nitrogen atom (usually in the form of NH or NH$_2$ or the like), attached to a carbon atom of the organic nucleus, and at least one oxygen atom (usually in the form of a hydroxyl group), attached to a carbon atom of the organic nucleus; and at least one halogen atom, attached to a carbon atom of the organic nucleus. Nitrogen, halogen and oxygen contained in an organic body each attached to carbon can be designated as "organically combined".

The preferred reaction products contain at least one nitrogen atom attached to a carbon atom, oxygen attached to another carbon atom and halogen attached to still another carbon atom, of the nucleus.

The organic compounds produced often contain unsaturated radicals (radicals capable of adding iodine or the like).

These compounds in some cases, upon being heated with strong hydriodic acid solution, may yield alkyl iodide, thus the products produced from an unsubstituted dihalogenhydrin of glycerin, yield, in most cases at least, propyl or isopropyl iodide.

The experssion "unsubstituted dichloro- or dibromohydrins" in the specification and claims means dichloro- or dibromo-hydrins in which there is no side-chain.

I claim:

1. As new products, aliphatic organic bases derived from glycerine, by action of aqueous ammonia solution upon a glycerine dihalogenhydrin, which bodies are water-soluble, but alcohol-insoluble, of tough, viscous to resinous consistency which contain nitrogen, halogen and oxygen all linked to carbon, and which, on being decomposed with hydriodic acid, yield $C_3H_7I$.

2. As a new product, an aliphatic organic base produced by action of aqueous ammonia solution upon a dihologenhydrin, which product is water-soluble, of tough, viscous to resinous consistency and which contains nitrogen and halogen and at least one hydroxyl group all linked to carbon and which, on being decomposed with hydriodic acid, yields $C_3H_7I$.

3. As new products, aliphatic organic bases, produced by action of aqueous ammonia solution on dihalogenhydrins, without extraneous heating, which bodies are water-soluble, of tough, viscous to resinous consistency and which are unsaturated compounds containing nitrogen, halogen and oxygen, all linked to carbon.

4. As new products, aliphatic organic bases, produced by action of aqueous ammonia solution on dihalogenhydrins, without extraneous heating, which bodies are water-soluble, but alcohol-insoluble, of tough, viscous to resinous consistency and which are unsaturated compounds containing nitrogen, halogen and oxygen all linked to carbon and which, on being decomposed with hydriodic acid, yield $C_3H_7I$.

5. As new products, aliphatic organic bases derived from glycerine, by action of aqueous ammonia solution upon a glycerine dihalogenhydrin, which bodies are water-soluble, of tough, viscous to resinous consistency which contain nitrogen, halogen and oxygen all linked to carbon, and which, on being decomposed with hydriodic acid, yield $C_3H_7I$.

6. As new products, aliphatic organic bases, produced by action of aqueous ammonia solution on dihalogenhydrins, without extraneous heating, which bodies are water-soluble, of tough, vicsous to resinous consistency and which are unsaturated compounds containing nitrogen, halogen and oxygen all linked to carbon.

7. As new products, aliphatic organic bases, which bodies are water-soluble, of tough, viscous to resinous consistency and which are unsaturated compounds containing nitrogen, halogen and oxygen all linked to carbon and which, on being decomposed with hydriodic acid, yield $C_3H_7I$, said products being produced by acting on a dihalogenhydrin, with ammonia and water without applying extraneous heat to the reacting mass.

8. As new products, aliphatic compounds which are water-soluble and at least partly alcohol-soluble, and which contain halogen and nitrogen both united to carbon atoms in said aliphatic compounds, said compounds being the reaction products of ammonia upon an unsubstituted dihalogenhydrin reacted in the presence of water.

9. As new products, aliphatic compounds which are water-soluble and at least partly alcohol-soluble, and which contain halogen and nitrogen both united to carbon atoms in said aliphatic compounds, said compounds being the reaction products of ammonia upon an unsubstituted dihalogenhydrin of glycerine reacted in the presence of water.

10. A process of making water-soluble aliphatic products containing a nitrogen-hydrogen group and a hydroxyl group and chlorine, which substituents are each attached to a carbon atom in an aliphatic chain, which comprises reacting upon one mol. of dichlorohydrin with about 1.7 mol. of ammonia, in the presence of water as a vehicle.

LEON LILIENFELD.